United States Patent
Wang et al.

(10) Patent No.: US 7,600,930 B2
(45) Date of Patent: Oct. 13, 2009

(54) LENS COVER ASSEMBLY AND ELECTRONIC DEVICE USING THE SAME

(75) Inventors: Jun Wang, Shenzhen (CN); Hsiao-Hua Tu, Taipei Hsien (TW); Peng-Jin Ge, Shenzhen (CN); Rui-Hao Chen, Shenzhen (CN); Gang Yang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 286 days.

(21) Appl. No.: 11/616,842

(22) Filed: Dec. 27, 2006

(65) Prior Publication Data

US 2008/0044173 A1    Feb. 21, 2008

(30) Foreign Application Priority Data

Aug. 18, 2006   (CN) .................... 2006 1 0062176

(51) Int. Cl.
G02B 7/02 (2006.01)
G02B 17/00 (2006.01)

(52) U.S. Cl. ..................................... 396/448; 359/511

(58) Field of Classification Search ......... 359/507–514, 359/611, 819; 396/439, 448, 535, 544; 348/373–376
See application file for complete search history.

(56) References Cited

U.S. PATENT DOCUMENTS

| | | | | |
|---|---|---|---|---|
| 4,385,812 A * | 5/1983 | Wille et al. .................. 359/511 |
| 5,815,757 A * | 9/1998 | Katsura et al. ............... 396/529 |
| 5,926,322 A * | 7/1999 | Iwasaki ....................... 359/694 |
| 6,018,426 A * | 1/2000 | Funahashi .................... 359/819 |
| 6,783,286 B2 * | 8/2004 | Maeda et al. ................. 396/427 |
| 6,811,331 B2 * | 11/2004 | Iwasa .......................... 396/500 |
| 6,834,161 B1 * | 12/2004 | Stiehler ....................... 396/103 |
| 7,004,672 B2 * | 2/2006 | Iikawa et al. ................ 403/348 |
| 7,292,281 B2 * | 11/2007 | Cheng ......................... 348/373 |
| 2001/0053289 A1 * | 12/2001 | Imanari et al. .............. 396/531 |
| 2004/0042093 A1 * | 3/2004 | Nomura ....................... 359/819 |
| 2006/0007551 A1 * | 1/2006 | Sakurai et al. .............. 359/611 |
| 2006/0158750 A1 * | 7/2006 | Takahashi .................... 359/819 |
| 2007/0269202 A1 * | 11/2007 | Forsyth-Martinez et al. 396/429 |
| 2008/0044173 A1 * | 2/2008 | Wang et al. .................. 396/448 |

* cited by examiner

*Primary Examiner*—W B Perkey
*Assistant Examiner*—Dennis Hancock
(74) *Attorney, Agent, or Firm*—Steven M. Reiss (57) ABSTRACT

A lens cover assembly (200) mounted in an electronic device (300) includes a lens cover (30), and a frame (20). The lens cover includes a base (32), and a column (34) extending from a central area of the base. The base has at least one notch (36) defined therein. The frame has a stepped hole (26) defined by a first circumferential wall (262), a second circumferential wall (264), and a connecting surface (266) connecting the first circumferential wall to the second circumferential wall. At least two blocks (28) extend from the first circumferential wall and overlie the connecting surface. In assembly, the lens cover is received in the stepped hole. Then the base is rotated relative to the frame about an axis of the stepped hole so that the base is sandwiched between the blocks and connecting surface to lock the lens cover in the frame.

17 Claims, 8 Drawing Sheets

LENS COVER ASSEMBLY AND ELECTRONIC DEVICE USING THE SAME

BACKGROUND OF THE INVENTION

1. Field of the Invention

The present invention generally relates to lens cover assemblies and, more particularly, to a lens cover assembly for seating a lens in an electronic device and an electronic device using the same.

2. Description of Related Art

Nowadays, electronic devices with a digital camera mounted thereon are widely used. A lens cover is customarily used to prevent a digital camera from being scraped or dirtied. Therefore, a lens cover assembly for seating the lens cover in an electronic device is needed.

Figure 8:
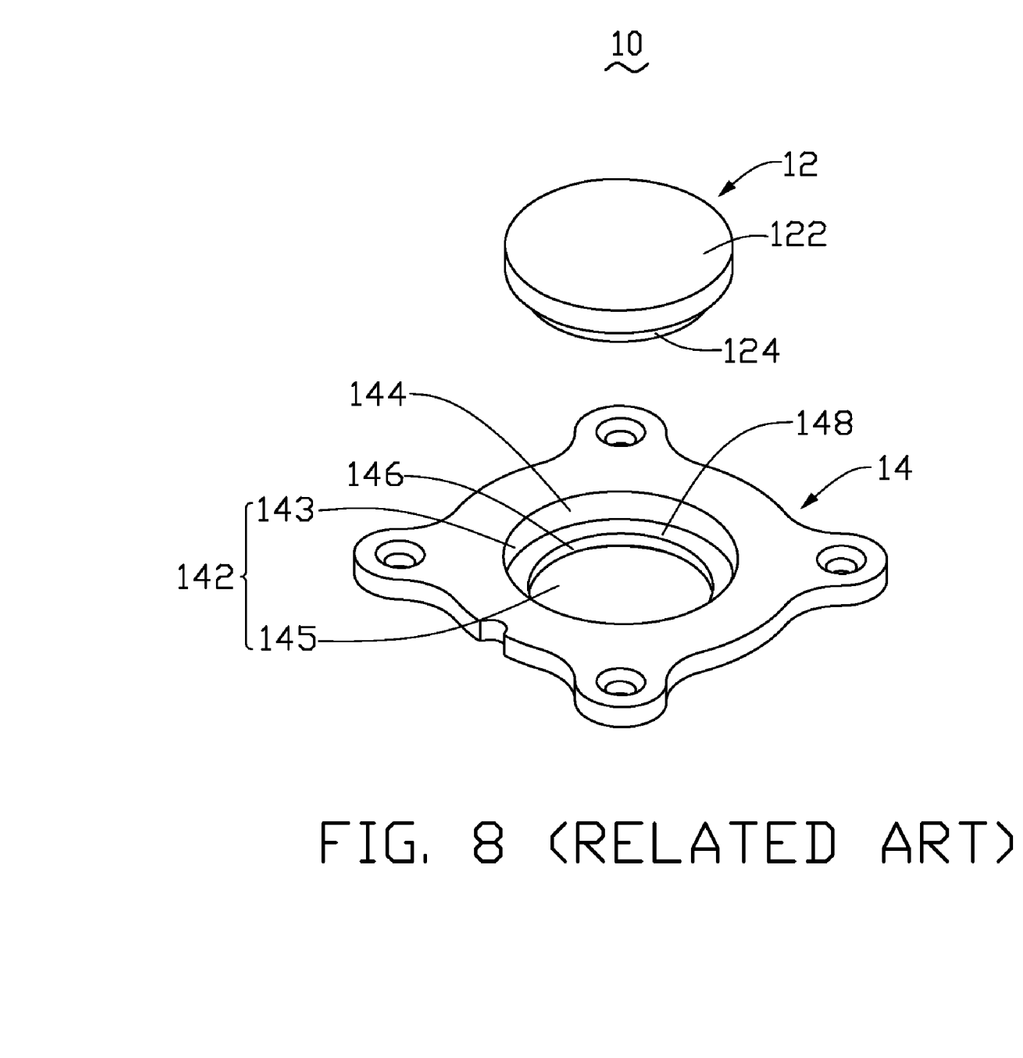
FIG. 8 is an exploded isometric view of a typical lens cover assembly.

Referring to FIG. 8, a typical lens cover assembly 10 is shown. The lens cover assembly 10 includes a lens cover 12 and a frame 14. The lens cover 12 includes a base 122, and a circular protrusion 124 extending from one side of the base 122. The frame 14 has a stepped hole. The stepped hole has a large hole 143 defined by a first circumferential wall 144, and a small hole 145 defined by a second circumferential wall 146. A connecting surface 148 connects the first circumferential wall 144 to the second circumferential wall 146. In assembly of such lens cover assembly 10, firstly, some glue is dropped to the connecting surface 148. Then, the circular protrusion 124 of the lens cover 12 is received in the small hole 145, and the base 122 adheres to the connecting surface 148. After the glue is solidified, the lens cover 12 is attached to the frame 14.

However, the protrusion 124 of the lens cover 12 is easily polluted by the glue during assembly, thus the image quality might be reduced. Furthermore, the glue is unevenly distributed on the connecting surface 148 so that the base 122 of the lens cover 12 may be inclined relative to the frame 14. As a result, the appearance of the electronic device and the image quality may be affected.

Therefore, a lens cover assembly and an electronic device using the same are desired in order to overcome the above-described problems.

SUMMARY OF THE INVENTION

One embodiment of the lens cover assembly mounted in an electronic device includes a lens cover, and a frame. The lens cover includes a base and a column extending from a central area of the base. The base has at least one notch defined therein. The frame has a stepped hole defined by a first circumferential wall, a second circumferential wall, and a connecting surface connecting the first circumferential wall to the second circumferential wall. The frame has at least two blocks extending from the first circumferential wall. Each block overlies the connecting surface. In assembly, the lens cover is received in the stepped hole. The edge of the base is held between the blocks and the connecting surface by means of the at least one notch. Then the base rotates relative to an axis of the stepped hole so that the at least one notch keeps away from a corresponding block. Therefore, the lens cover is locked in the frame.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present lens cover assembly. Moreover, in the drawings, like reference numerals designate corresponding parts throughout the several views.

DETAILED DESCRIPTION OF THE INVENTION

Figure 1:
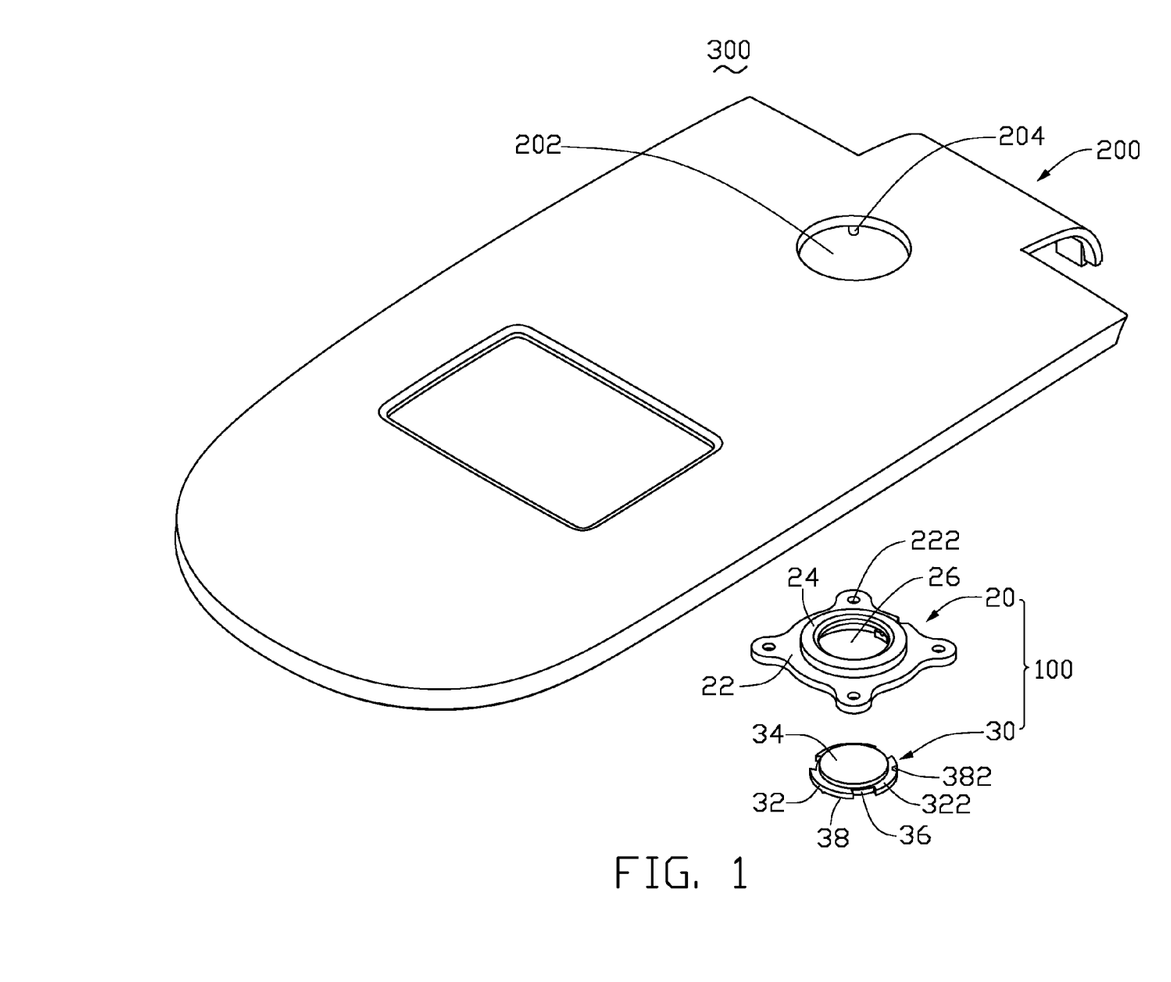
FIG. 1 is an isometric, exploded view of an electronic device incorporating a lens cover assembly, in accordance with one embodiment.

Referring to FIG. 1, an exemplary lens cover assembly 100 applied to an electronic device 300 such as mobile phone is shown. The electronic device 300 has a shell 200. The shell 200 has a through hole 202 defined above a middle portion therein. Four positioning posts 204 perpendicularly extend from an inside surface (not labeled) of the shell 200. The four positioning posts 204 are positioned adjacent to a periphery of the through hole 202 at uniform intervals. However, it may be understood that the number and/or arrangement of the positioning posts 204 could be varied and still be within the scope of the present embodiment.

Figure 2:
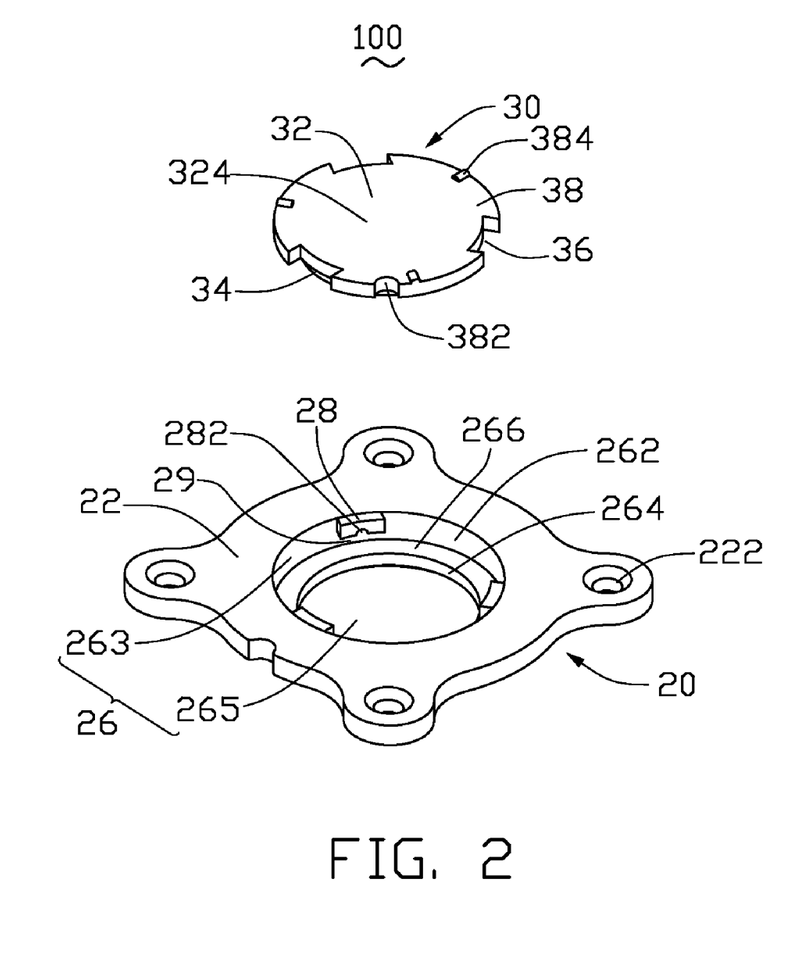
FIG. 2 is an enlarged view of the frame and the lens cover of FIG. 1, but viewed from another aspect.

Also referring to FIG. 2, the lens cover assembly 100 includes a frame 20 and a lens cover 30. The frame 20 includes a fixing portion 22, and a protruding portion 24 extending toward one side from a central area of the fixing portion 22. The protruding portion 24 is cylindrical in shape. The fixing portion 22 is substantially square. The fixing portion 22 has four positioning holes 222 each defined at a corner thereof. Each positioning hole 222 is configured (i.e., structured and arranged) for receiving a corresponding positioning post 204 of the shell 200.

A through stepped hole 26 is formed at a middle portion of the protruding portion 24 of the frame 20. The stepped hole 26 includes a large hole 263 defined by a first circumferential wall 262, and a small hole 265 defined by a second circumferential wall 264. A connecting surface 266 connects the first circumferential wall 262 to the second circumferential wall 264. Three spaced blocks 28 perpendicularly extend from the first circumferential wall 262 and locates above the connecting surface 266. Each block 28 extends toward a central axis of the stepped hole 26. A top surface of each block 28 is substantially coplanar with a surface of the fixing portion 22 opposing the protruding portion 24. A space 29 is defined between each of the blocks 28 and the connecting surface 266 in the axis of the stepped hole 26. Each block 28 has a groove 282 defined at one side thereof toward the connecting surface 266. Each groove 282 has a semicircular shaped cross-section along a traverse direction.

The lens cover 30 is made of transparent material, such as glass, poly methyl methacrylate (PMMA) and so on. The lens cover 30 includes a base 32, and a column 34 integrally formed with the base 32. The thickness of the base 32 is configured (i.e., structured and arranged) to fit into the space 29 defined by the blocks 28 and the connecting surface 266. The base 32 has a first side surface 322 and an opposite second side surface 324. The base 32 is substantially disk-shaped, and has three latching portions 38 disposed at uniform intervals. A notch 36 is defined between each two adjacent latching portions 38. The notches 36 communicate the first side surface 322 with the second side surface 324. Each latching portion 38 has a semicircular protrusion 384 radially positioned on the second side surface 324. Each protrusion 384 is configured (i.e., structured and arranged) for being received in a given groove 282 of the block 28. One of the latching portions 38 defines an arcuate slot 382 therein. The column 34 is disposed on a central area of the first side surface 322 of the base 32, and is configured for engaging in the small hole 265 of the frame 20.

Figure 3:
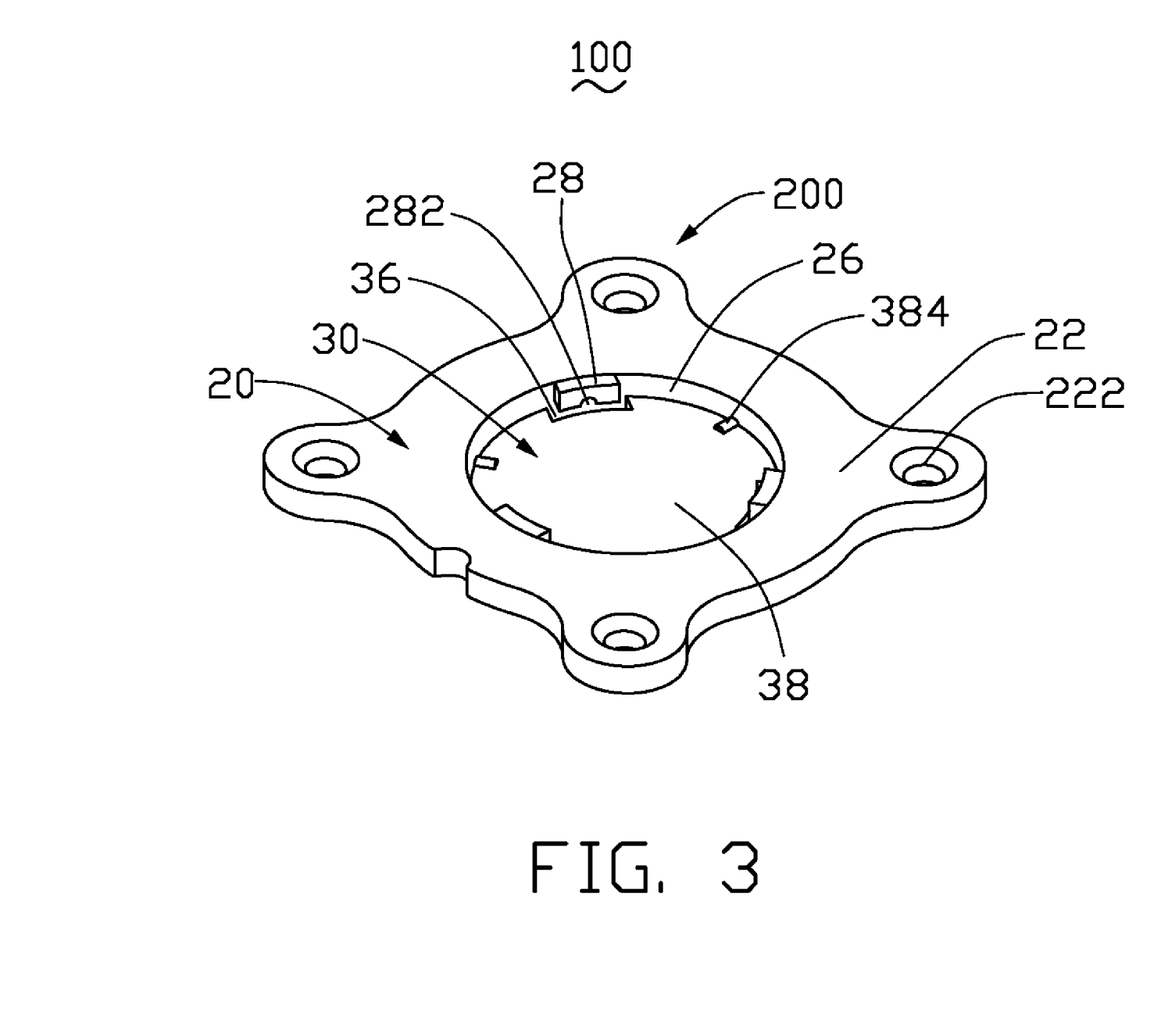
FIG. 3 is similar to FIG. 2, but showing the lens cover mounted on the frame.
Figure 4:
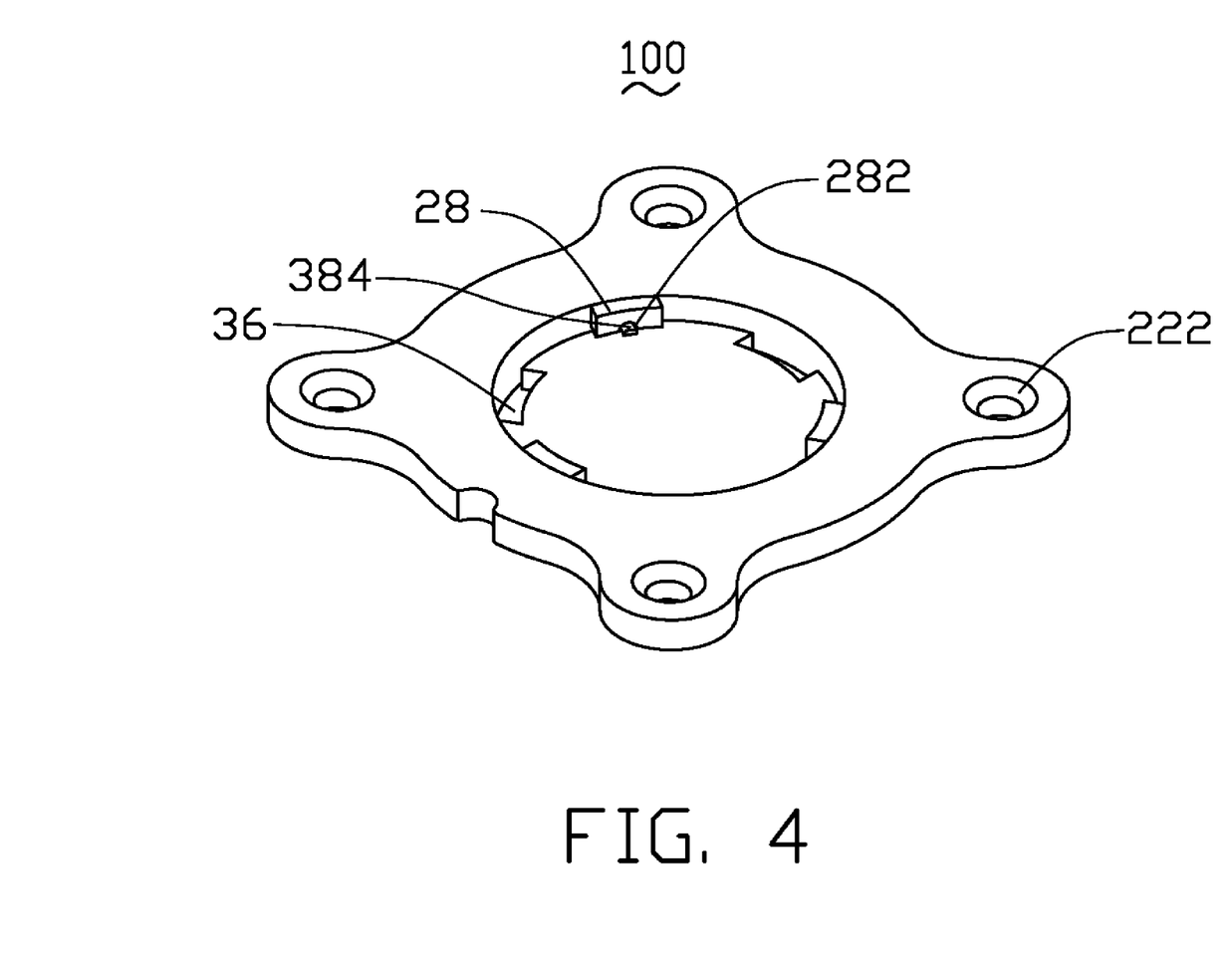
FIG. 4 is similar to FIG. 3, but showing the lens cover having been rotated through a angle so as to be locked in the frame.

In assembly, referring to FIGS. 3-4, firstly, the column 34 of the lens cover 30 is lowered into the small hole 265 of the frame 20. Each block 28 is received in a corresponding notch 36, and each protrusion 384 is positioned between two contiguous blocks 28. The base 32 of the lens cover 30 is placed on the connecting surface 266 of the frame 20, as shown in FIG. 3. Then, a thin rod-like tool is inserted in the slot 382 of the lens cover 30, and brings the lens cover 30 to rotate about an axis thereof so that the base 32 is sandwiched between the blocks 28 and the connecting surface 266 and each of the protrusions 384 of the lens cover 30 are engaged in a corresponding groove 282, as shown in FIG. 4. In this manner the lens cover 30 is stably attached to the frame 20.

Figure 5:
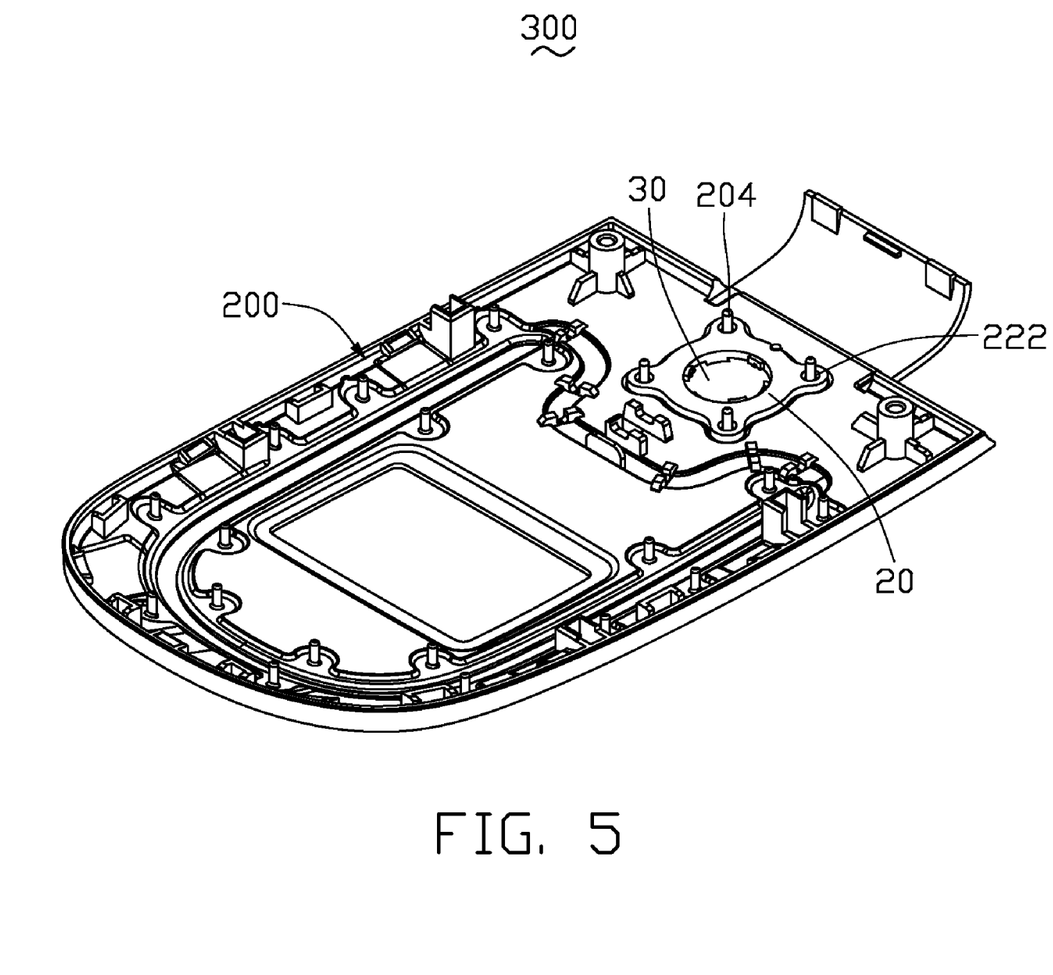
FIG. 5 is an assembled view of the electronic device shown in FIG. 1.

The assembled lens cover structure 100 is assembled into the electronic device 300. Referring to FIG. 5, the positioning holes 222 are aligned with the corresponding positioning posts 204, respectively. The protruding portion 24 passes through the through hole 202 of the shell 200. The ends of each of the positioning posts 204 are advantageously melted/welded or soldered to allow permanent attachment to the fixing portion 22 of the frame 20, so that the lens cover assembly 100 is fixed to the shell 200.

A main advantage of the lens cover assembly 100 is that the glue may be omitted during the assembly of the lens cover assembly 100. Therefore, it is not possible for the column 34 of the lens cover 30 to be polluted by glue. In addition, the lens cover 30 avoids being inclined relative to the frame thus allowing uniform distribution of the glue. As a result, the image quality is increased, and the appearance of the electronic device 300 is improved.

Figure 6:
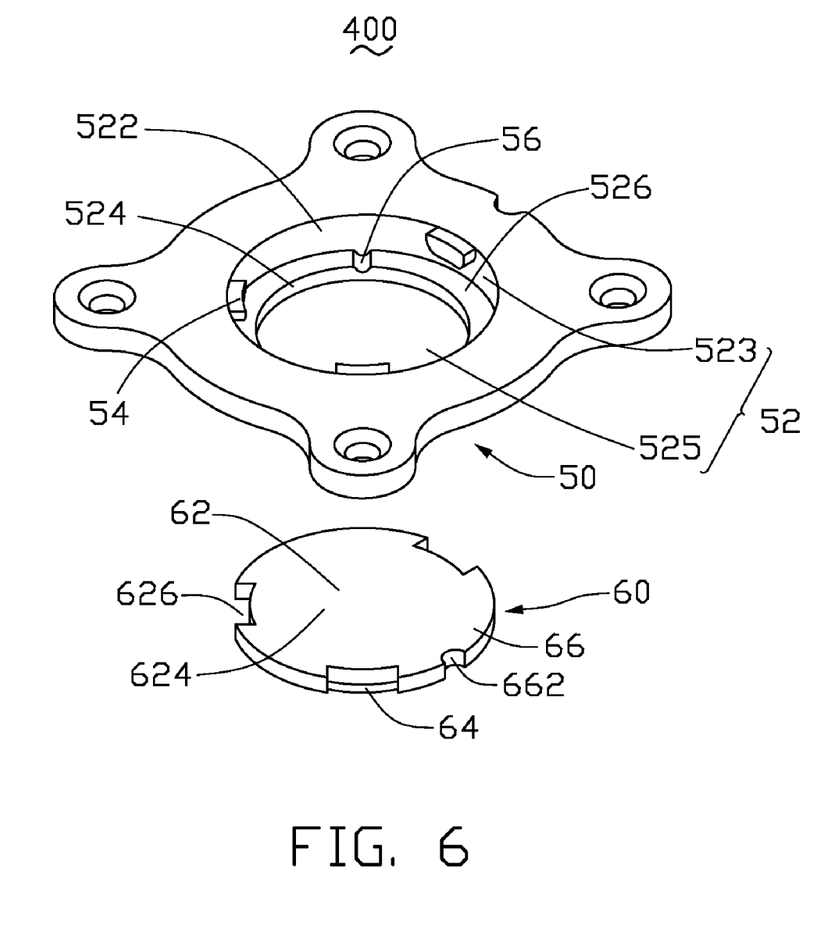
FIG. 6 is an exploded, isometric view of a lens cover assembly in accordance with another embodiment.
Figure 7:
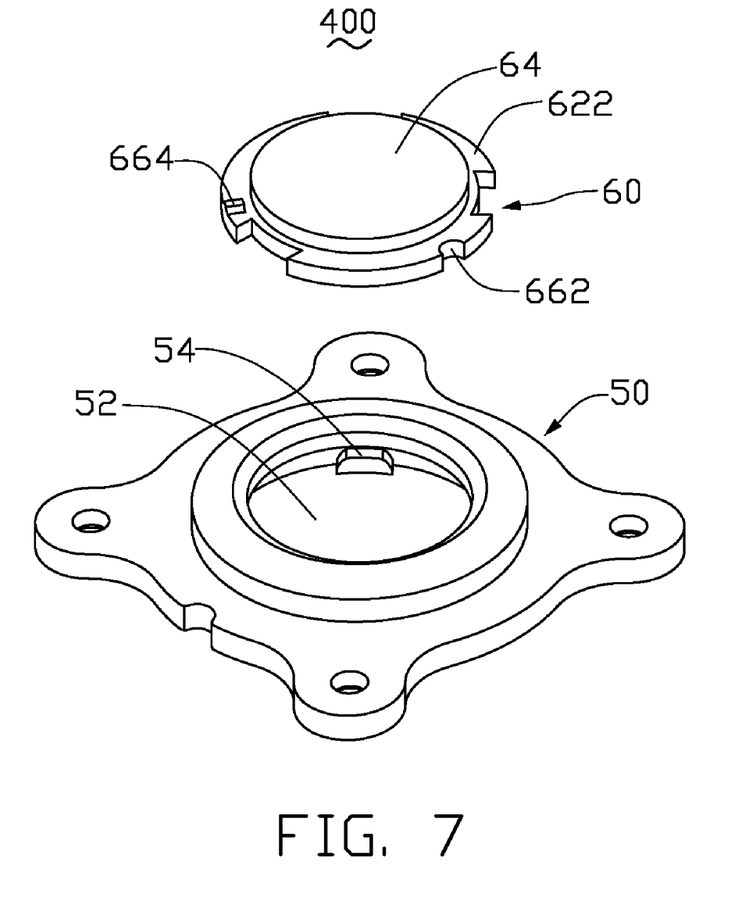
FIG. 7 is similar to FIG. 6, but viewed from another aspect.

In another alternative embodiment, referring to FIGS. 6-7, a lens cover assembly 400 includes a frame 50 and a lens cover 60. The frame 50 defines a stepped hole 52. The stepped hole 52 includes a large hole 523 defined by a first circumferential wall 522, and a small hole 525 defined by a second circumferential wall 524. A connecting surface 526 connects the first circumferential wall 522 with the second circumferential wall 524. Three blocks 54 each perpendicularly extends from the first circumferential wall 522, and overlies the connecting surface 526. A groove 56 is defined in the connecting surface 526. The groove 56 is positioned between two contiguous blocks 54 and oriented towards the axis of the stepped hole 52. The lens cover 60 includes a base 62, and a column 64 integrally formed with the base 62. The base 62 has a first side surface 622 and an opposite second side surface 624. The base 62 has three latching portions 622 at uniform intervals. A notch 626 is defined between contiguous latching portions 622. One of the latching portions 622 has a protrusion 664 disposed on the first side surface 622. The other latching portion 622 has a slot 662 defined therein. The column 64 is disposed on a central area of the first side surface 622 of the base 62.

In assembly of the lens cover assembly 400, firstly, the column 64 of the lens cover 60 is lowed into the small hole 525 of the frame 50. Each block 54 is received in a corresponding notch 626, and the protrusion 664 is positioned between two contiguous blocks 54. The base 62 of the lens cover 60 is put on the connecting surface 526 of the frame 50. Then, a thin rod-like tool is inserted in the slot 662 of the lens cover 60, and brings the lens cover 60 to rotate about an axis thereof so that the protrusion 664 of the lens cover 60 is engaged in the corresponding groove 56. In this way the lens cover 60 is stably mounted on the frame 50.

In other alternative embodiments, the number of the blocks 54 may be two. The two opposite blocks 54 are disposed on the first circumferential wall 522. Accordingly, the number of notches 626 is two. It may be understood that one notch 626 may be omitted. During assembly, when the number of the notches 626 is one, a latching portion of the base 62 opposite to the notch 626 is inserted into the space between one block 54 and the connecting surface 526. Then, the opposite latching portion is rotated, and the other block 54 is received in the notch 626.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens cover assembly comprising:
   a lens cover including a base, and a column extending from a central area of the base, the base having a protrusion and defining at least one notch, the base having a slot defined therein configured for receiving a thin rod-like tool during the rotation of the lens cover; and
   a frame having a stepped hole defined by a first circumferential wall, a second circumferential wall, and a connecting surface connecting the first circumferential wall with the second circumferential wall, the frame having at least two blocks extending from the first circumferential wall, each block overlying the connecting surface with a space formed therebetween in an axis of the stepped hole, the connecting surface defining a groove corresponding to the protrusion of the base;
   wherein when the lens cover is received in the stepped hole, one of the blocks is received in the at least one notch, then the base is rotated about the axis of the stepped hole so that the at least one notch keeps away from said one of the blocks and the base is sandwiched between the blocks and the connecting surface in the spaces, and the protrusion interacts with the groove for preventing the lens cover from rotating relative to the frame.

2. The lens cover assembly as claimed in claim 1, wherein there are two notches, and each notch is configured for receiving one of the blocks to allow the lens cover to enter into the stepped hole.

3. The lens cover assembly as claimed in claim 2, wherein the two blocks are opposite to each other.

4. The lens cover assembly as claimed in claim 1, wherein there are three blocks and three notches, and each notch is configured for receiving a given block to allow the lens cover to enter into the stepped hole.

5. The lens cover assembly as claimed in claim 4, wherein the blocks are disposed at uniform intervals.

6. An electronic device comprising:
a shell having a through hole defined therein; and
a lens cover assembly mounted on the shell, including:
- a lens cover including a base, and a column extending from a middle of the base, the base having at least one notch, the base defining a slot configured for receiving a thin rod-like tool to rotate the lens cover; and
- a frame defining a stepped hole aligned with the through hole, the stepped hole including a large hole and a small hole, a connecting surface separating the large hole from the small hole, the frame having at least two blocks positioned in the large hole, each block overlying the connecting surface;
- wherein the lens cover is capable of entering into the stepped hole via the at least one notch aligned with one corresponding block and is rotatable relative to the frame about an axis of the stepped hole so that the at least one notch keeps away from the corresponding block, the base of the lens cover is received in the large hole and is sandwiched between the blocks and the connecting surface in the axis of the stepped hole, and the column of the lens cover is received in the small hole to cover the through hole of the shell.

7. The electronic device as claimed in claim 6, wherein the frame includes a fixing portion, and a protrusion portion extending from the fixing portion, the fixing portion is fixed on the shell, and the protrusion portion extends out of the through hole of the shell, the stepped hole being defined in the protrusion portion.

8. The electronic device as claimed in claim 7, wherein the fixing portion has four positioning holes defined therein, the shell has four positioning posts around the through hole, the positioning posts securely engage in the corresponding positioning holes so that the lens cover assembly is fixed to the shell.

9. The electronic device as claimed in claim 6, wherein the large hole is defined by a first circumferential wall, the two blocks are disposed on the first circumferential wall, each notch is configured for receiving one of the blocks.

10. The electronic device as claimed in claim 9, wherein one of the blocks his a groove, the base of the lens cover has a protrusion corresponding to the groove, the protrusion is locked in the groove and the protrusion interacts with the groove for preventing the lens cover from rotating relative to the frame.

11. The electronic device as claimed in claim 9, wherein a groove is defined on the connecting surface, the base of the lens cover has a protrusion corresponding to the groove, the protrusion is locked in the groove.

12. The electronic device as claimed in claim 6, wherein the number of the blocks and notches are both three, the three blocks are disposed at uniform intervals, each notch corresponds to a given block.

13. The electronic device as claimed in claim 12, wherein at least one block has a groove, the base of the lens cover has a protrusion corresponding to the groove, the protrusion is locked in the groove.

14. The electronic device as claimed in claim 12, wherein a groove is defined on the connecting surface, the base of the lens cover has a protrusion corresponding to the groove, the protrusion is locked in the groove.

15. A lens cover assembly comprising:
- a lens cover having a protrusion and defining at least one notch; and
- a frame having a receiving hale defined by a circumferential wall, the receiving hole being configured for receiving the lens cover, at least one block vertically extending from the circumferential wall, the block defining a groove corresponding to the protrusion of the lens cover;
- wherein when the lens cover is received in the receiving hole, the block is received in the notch, then the lens cover is rotated about the axis of the receiving hole until the protrusion is locked in the groove, the block prevents the lens cover getting away from the frame.

16. The lens cover assembly as claimed in claim 15, wherein there are three blacks and three notches, the three blocks are disposed at uniform intervals, each notch corresponds to a given block.

17. The lens cover assembly as claimed in claim 15, wherein the lens cover has a slot defined therein configured for receiving a thin rod-like tool during the rotation of the lens cover.

* * * * *